July 22, 1969      A. FISCHER      3,456,413
STRUCTURAL ELEMENT
Filed Dec. 1, 1966
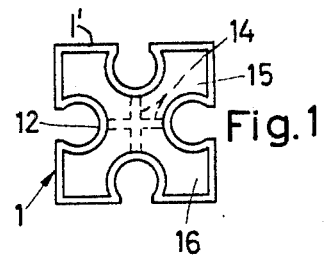
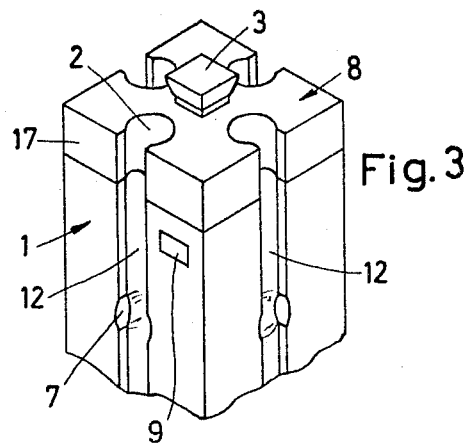
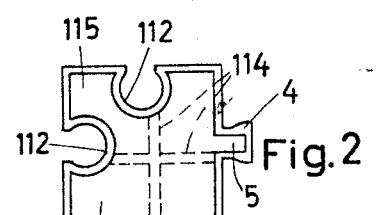
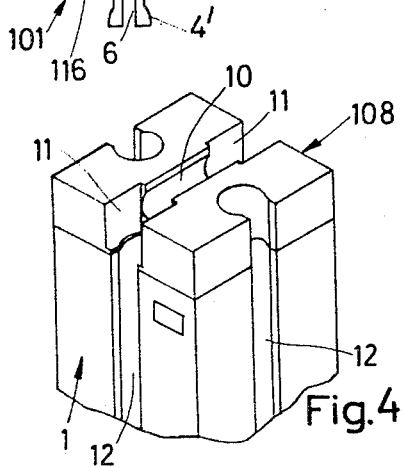
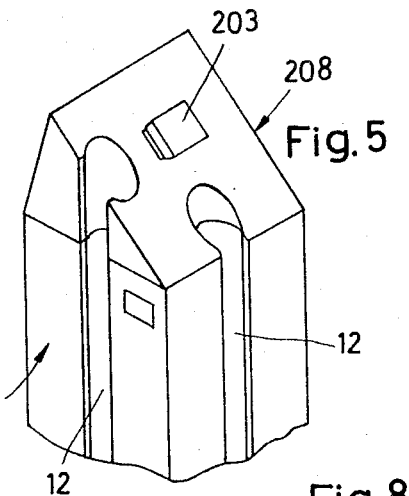
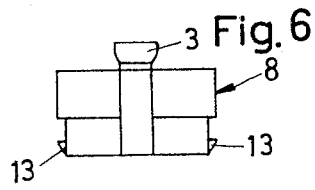
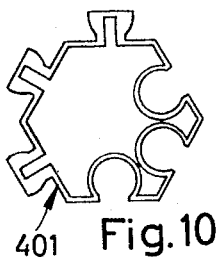
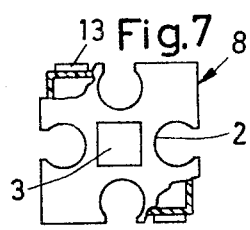
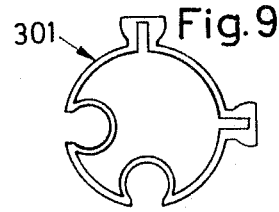
INVENTOR.
ARTUR FISCHER
BY United States Patent Office 3,456,413
Patented July 22, 1969

3,456,413
STRUCTURAL ELEMENT
Artur Fischer, 133 Grünmettstetterstrasse, 7241
Tumlingen, Kreis Freudenstadt, Germany
Filed Dec. 1, 1966, Ser. No. 598,522
Claims priority, application Germany, Dec. 1, 1965,
F 47,797
Int. Cl. E04c 1/30, 1/10, 3/30
U.S. Cl. 52—591         7 Claims

ABSTRACT OF THE DISCLOSURE

A structural element consisting of a hollow tubular body having a circumferential wall provided with an outer face, an end cap closing at least one open end of the hollow tubular body and also having an outer face, and male or female coupling means in form of a coupling head or an undercut groove provided on at least one of these faces so as to make possible connection of the structural element to other structural elements provided with complementary coupling means.

CROSS REFERENCES TO RELATED APPLICATIONS

In copending previous applications I have set forth structural elements, such as building blocks of solid cross-section and provided with at least one undercut groove and/or coupling projection in form of a coupling head so as to be connectable to other structural elements provided with complementary coupling means.

BACKGROUND OF THE INVENTION

The present invention relates to structural elements in general, and in particular to structural elements which are readily and releasably connectable to other structural elements.

It is known to provide structural elements, such as building blocks and the like, in form of members of solid cross-section and to provide the exterior surfaces of such elements either with undercut grooves or with projecting coupling heads which can be received in such grooves for establishing a releasable connection. Structural elements of this type, set forth in my above-mentioned copending applications have found wide acceptance and are very well suited for the various requirements which are made of them. However, there are two areas in which these elements could advantageously be improved, namely in ease of manufacture on the one hand, and in the requisite material on the other hand.

As for the first of these areas, it will be obvious that relatively rigid tolerance requirements are imposed on the manufacturer by the fact that the coupling head of one of these structural elements must be received in an undercut groove of another structural element. Thus, only very small tolerances are permissible. Since structural elements of this type are mass-produced at high speed and in very great quantities, it is often difficult to maintain these very precise tolerances with the result that the fit of the coupling heads in the undercut grooves may either be to loose, or conversely, the heads may not even be receivable in the undercut grooves. In either case the elements on which the excessive tolerance variation has occurred are not useable and constitute a loss to the manufacturer.

As for the second point mentioned above it will of course be obvious that it is desirable to save as much material in the manufacture of these structural elements as is possible without adversely affecting the characteristics and performance of the elements. Furthermore, if less material is used the elements are of lighter weight.

SUMMARY OF THE INVENTION

It is thus a general object of the present invention to provide the improvements which have been indicated above as desirable.

A more specific object of the invention is to provide a structural element which is lighter in weight than similar structural elements known herebefore.

A further object of the invention is to provide such a structural element which requires less material than structural elements of this type which are presently known.

A concomitant object of the invention is to provide a structural element of the type set forth above in which greater tolerance variations during the manufacturing process, particularly in the manufacture with mass-production methods, are permissible than was heretofore the case.

Yet another object of the invention is to provide such a structural element which is highly versatile and which is, from a point of view of its desirable performance characteristics, the full equivalent of similar structural elements known until now.

In accordance with these and other objects of the invention one feature of the present invention consists in the provision of a structural element adapted to be connected to other structural elements and comprising a tubular body having opposite open ends, and a circumferential wall having an outer face. My novel structural element further comprises end cap means which closes at least one of the above-mentioned open ends and which also has an outer surface, and coupling means provided on at least one of these faces for matingly engaging complementary coupling means provided on elements to which the structural element set forth herein is to be connected.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a transverse section through a structural element constructed in accordance with the present invention, and showing one possible embodiment;

FIG. 2 is a view similar to FIG. 1 but showing another possible embodiment of the invention;

FIG. 3 is a perspective partial view of a structural element constructed in accordance with the invention;

FIG. 4 is a view similar to FIG. 3 but showing yet a further embodiment;

FIG. 5 is also similar to FIG. 3 but shows an additional embodiment of the invention;

FIG. 6 is a lateral view of an end cap means for use on he structural element herein disclosed;

FIG. 7 is a top-plan view of the end cap means shown in FIG. 6, partly broken away; and FIGS. 8–10 are further transverse sections taken through structural elements in accordance with the present invention embodying the yet additional modifications.

DESCRIPTION OF THE PREFERRED EMBODIMENTS

Discussing now the drawing in detail, and firstly FIG. 1 thereof, it will be seen that there is shown a generally tubular hollow body 1. In FIG. 1 this body is of quadratic cross-section and comprises a peripheral wall 1'. As is evident from FIG. 3 which will be described subsequenty, the structural elements discussed herein are elongated, and it should be pointed out here that they have opposite open ends. Returning to FIG. 1, it will be noted that the structural element 1 shown therein is provided in its outer circumferential face, or rather in each of the four portions which together define this face, with an inwardly undercut groove 12 which extends in longitudinal direction of the structural element 1. The structural element shown in FIG. 1, as well as all of the structural elements disclosed herein, can advantageously be made from either a metallic material or from a shape-retaining tough, elastic synthetic plastic material, such as nylon or the like, and can be manufactured in various different ways, for instance by an extrusion process.

The structural element 101 shown in FIG. 2 differs from that in FIG. 1 only slightly in that only two of the four sides of the structural elements 101 in FIG. 2 are provided with the longitudinally extending inwardly undercut grooves which here are indicated with reference numeral 112 whereas the two remaining sides are provided with similarly longitudinally extending coupling projections consisting of a head 4 carried by a narrower neck which connects the head to the respective side of the structural element 101. It is, in fact, such heads which are to be received in the undercut grooves 12 of FIG. 1 and 112 of FIG. 2. It will be appreciated that by virtue of their configurations the heads are also "undercut," so that reference herein to undercut coupling means—whether in the specification or the claims—indicates either an undercut groove as shown for instance in the outer surface of the cap member in the still-to-be-discussed FIG. 4, or an undercut bead or projection as shown on the cap member of FIGS. 3 and 5 or on the respective tubular bodies. It is clearly shown in FIGS. 1 and 2 that the grooves 12 and 112, respectively, are actually constituted by inwardly bulging extensions of the circumferential wall 1'. Thus, it will be evident that, when coupling heads corresponding to the heads 4 shown in FIG. 2 are inserted into one of these grooves, the elastic material of the wall 1' is capable of yielding by being deflected into the spaces 15 and 16 of FIG. 1 or 115 and 116 of FIG. 2. To further assist proper accommodation of the coupling heads 4 to the respective grooves, or, in other words, to make allowance for the occurrence of tolerance variations which could not be absorbed by the elasticity of the wall portions bounding these grooves alone, the coupling heads 4 may be provided with a longitudinally extending slot 5 extending from the interior or the structural element into the coupling heads, or alternately the coupling heads 4' which are also shown in FIG. 2 may be provided with an elongated slot 6, extending towards but not into the circumferential wall of the structural element 101. Obviously, this permits compression of the respective coupling heads 4, 4' in the direction transversely of the elongation of these slots 5 and 6.

Under certain circumstances, the deformation resistance of such hollow structural elements may not be adequate per se and it is therefore contemplated as part of the inventive concept to provide internal stiffening members or ribs 14 (FIG. 1) or 114 (FIG. 2) which advantageously extend across the interior of the respective structural element between opposite wall portions, for instance between oppositely located grooves 12 in FIG. 1. Of course, such ribs may extend only in one cross-wise direction or they may extend in both cross-wise directions as is shown in FIGS. 1 and 2, and they may be separately introduced or, advantageously, made integrally with the respective structural element during the manufacture of the same. In the arrangement of these reinforcing ribs, it is necessary to take care that they do not prevent yielding or flexing of the wall portions of the circumferential wall into the spaces 15 and 16 or 115 and 116 (FIGS. 1 and 2, respectively) when coupling heads are introduced into the corresponding grooves.

FIG. 3 shows how a structural element in accordance with the present invention can be provided with at least one end cap to close off at least one of its open ends. Like elements are indicated by reference numerals corresponding to those used in FIG. 1. The end cap in FIG. 3 is indicated with reference numeral 8 and it will be seen that it has an end face and lateral face portions 17 which are located adjacent corresponding face portions of the structural element 1. Advantageously, the lateral face portions 17 are flush with the corresponding face portions of the element 1. The lateral face portions of the end cap 8 are provided with undercut grooves 2 of identical configuration to those provided in the element 1 and indicated with reference numeral 12, and these grooves 2 are so arranged as to be axially aligned with the grooves 12. The end face of end cap 8 carries a coupling projection 3 which, as is evident from the drawing, is undercut so as to be receivable in a groove similar to the grooves 12. Its free face is preferably of protruding outline although this is of course not necessarily the case.

To be able to secure rod or shaft-like elements to the structural element 1, which may be necessary or desirable in certain applications thereof, it is advantageous to provide aligned openings 7 in opposite wall portions of the element 1 so that such rod or shaft-like elements can be pushed through the element 1 and extend through such aligned openings 7.

The end cap 8 can be secured to the body of element 1 in various different ways, for instance by being screw-threadedly secured thereto, by means of a friction fit, adhesively, by means of pins or in a similar manner. One possibility is shown in FIGS. 6 and 7, as well as in FIG. 3. Particularly from FIGS. 6 and 7 it is evident that the end cap 8 is provided with outwardly extending projections 13 which, when the end cap is secured to the body of element 1 are located within this body. The body itself is provided with recesses or cutouts 9 which are so arranged that the projections 13 will snap into them to thereby secure the end cap 8 to the body of element 1. Of course, if one of the other ways of securing the end cap to the body of element 1 is selected, then the projections 13 can be eliminated.

Coming now to FIG. 4, it will be seen that this is substantially similar to FIG. 3 and that it differs therefrom only in that the end cap, which here is indicated with reference numeral 108, is provided with an undercut groove 10 in its end face, in place of the projection 3 shown in FIG. 3. The cross sectional configuration of this groove 10 corresponds to that of the groves 12 provided in the body of element 1. It is to be noted that two or more elements of the general configuration of those shown in FIGS. 3 and 4, for instance, will frequently be secured with their respective end faces abutting one another. With an arrangement such as shown in FIG. 3, it will then be impossible to secure additional elements to these connected elements by inserting projections or coupling heads into the grooves 2 and 12. This disadvantage is eliminated in FIG. 4 where it will be seen that the ends of the groove 10 in the end cap 108 are widened at 11 so that coupling heads corresponding to the heads 3, 4, 4' can be inserted into these widened portions 11 in the direction transversely of the elongation of the grooves 12 and can then be slit into these in axial direction thereof.

Under certain circumstances it will obviously be desirable to be able to connect additional structural elements to elements of the type shown in the drawing at an angle of other than 90°. To make this possible the end face of the end cap which in FIG. 5 is indicated with reference numeral 208 extends not normal to the elongation of the body of element 1 and to the elongation of the grooves 12, but extends at an angle thereto and it would be evident that this permits the desired type of positioning of additional elements. In FIG. 5 this inclined end face is shown as being provided with a coupling projection 203 corresponding to the coupling projection 3 in FIG. 3.

FIGS. 8–10, finally, show that the cross-sectional outline of the structural elements need by no means be quadratic as shown in the preceding figures. FIG. 8, for instance shows a structural element 201 of triangular cross-sectional outline, FIG. 9 shows an element 301 of circular cross-sectional outline, and FIG. 10 shows an element 401 of polygonal cross-sectional outline. Except for this difference, these elements are similar to the ones shown in the preceding figures with respect to the various coupling portions, namely grooves or projections, which can be provided on them, the materials which are useable for them, and the like.

Structural elements such as those disclosed herein lend themselves well for use in toy building or assembly kits, but are by no means limited to this application since they are also well suited for general construction purposes.

It will be understood that each of the elements described above, or two or more together, may also find a useful application in other types of elements, differing from the types described above.

What is claimed as new and desired to be protected by Letters Patent is set forth in the appended claims:

1. A structural element adapted to be connected to other structural elements and comprising a tubular body having a circumferential wall including a plurality of mutually inclined exterior surfaces, said tubular body having at least one open end; end cap means closing said open end and having an end surface facing away from said body and a plurality of mutually inclined lateral surfaces flush with the respective adjacent exterior surfaces of said body; and coupling means provided at least on said exterior surfaces and said end surface for matingly engaging complementary coupling means provided on other elements to which said structural element is to be connected, said coupling means comprising undercut first grooves provided in said exterior surfaces of said body and undercut second grooves provided in said lateral surfaces of said end cap means and each aligned with one of said first grooves.

2. An element as defined in claim 1; and further comprising registering openings provided in oppositely located portions of said circumferential wall and adapted to receive a shaft member therein.

3. An element as defined in claim 1, wherein said end surface is inclined with reference to the elongation of said tubular body.

4. An element as defined in claim 1, wherein said coupling means includes a coupling projection extending from said end surface and having a wider head portion and a narrower neck portion connecting said head portion to said end surface.

5. An element as defined in claim 1, wherein said end surface extends normal to the elongation of said tubular body and said coupling means is an undercut groove provided on said end surface.

6. A structural element adapted to be connected to other structural elements and comprising a tubular body having a circumferential wall including a plurality of exterior faces, said tubular body having at least one open end; end cap means closing said open end and having an outer surface including an end face and a plurality of lateral faces each adjacent to and flush with one of said exterior faces; and elongated undercut coupling means provided on at least one of said exterior faces and on the associated adjacent lateral face continuing from one to the other to thereby enable mating connection of said undercut coupling means with complementary coupling means provided on other elements from the direction of said end face of said end cap means.

7. A structural element adapted to be connected to other structural elements and comprising a tubular body having a circumferential wall including a plurality of exterior faces, said tubular body having at least one open end; end cap means closing said open end and having an outer surface including an end face and a plurality of lateral faces each adjacent to and flush with one of said exterior faces; and at least one continuing elongated undercut coupling groove extending longitudinally of said element and including a first portion provided in one of said exterior faces and a second portion provided in the lateral face associated with said one exterior face, said first and second portions being longitudinally aligned and together constituting said continuing coupling groove to thereby enable mating introductions into the same at said end face of said end cap means of complementary coupling means provided on other elements.

References Cited

UNITED STATES PATENTS

| 2,205,730 | 6/1940 | Morgan | 52—594 X |
| 2,392,552 | 1/1946 | Roe | 52—309 |
| 2,565,823 | 8/1951 | Poal | 46—25 |
| 3,076,286 | 2/1963 | Czecholinski | 52—594 X |
| 3,148,477 | 9/1964 | Bjorn | 52—591 |

FOREIGN PATENTS

| 54,584 | 10/1949 | France. |
| 1,321,609 | 2/1963 | France. |
| 795,078 | 5/1958 | Great Britain. |
| 1,000,616 | 8/1965 | Great Britain. |
| 358,573 | 1/1962 | Switzerland. |

ALFRED C. PERHAM, Primary Examiner

U.S. Cl. X.R.

46—25, 28; 52—726